United States Patent [19]

Hodits, Jr. et al.

[11] 4,209,997
[45] Jul. 1, 1980

[54] ACCUMULATOR CYCLING SWITCH

[76] Inventors: Frank W. Hodits, Jr., Kettering; Richard K. Fryman, Miamisburg, both of Ohio

[21] Appl. No.: 960,458

[22] Filed: Nov. 13, 1978

[51] Int. Cl.² ............................................. F25B 1/00
[52] U.S. Cl. .................................... 62/226; 200/83 J; 251/61.2
[58] Field of Search ........................ 251/61.2; 62/226; 200/83 R, 83 J

[56] References Cited

U.S. PATENT DOCUMENTS

| | | | |
|---|---|---|---|
| 1,766,602 | 7/1930 | Hull | 62/226 X |
| 3,302,269 | 2/1967 | Cooper et al. | 200/83 P |
| 3,354,897 | 11/1967 | Koch et al. | 251/61 X |
| 3,376,794 | 4/1968 | Griffith et al. | 200/83 R X |
| 3,807,448 | 4/1974 | Hadden | 251/61.2 X |
| 3,898,405 | 8/1975 | Weber | 200/83 J |
| 4,049,935 | 9/1977 | Gruber | 200/83 P |

Primary Examiner—William E. Wayner
Assistant Examiner—William E. Tapolcai, Jr

[57] ABSTRACT

In a vehicle air conditioning system, an improved combination accumulator housing and cycling switch assembly for controlling operation of a compressor in response to refrigerant pressure within the interior of the housing. The housing has a flexure or creep action type diaphragm secured in overlying relation to aperture means in the accumulator housing exterior wall in a sealed spaced manner to effectively close the aperture means to direct communication between the interior housing and the ambient air. The central portion of the diaphragm extends over a stepped counterbore of the switch assembly so as to be movable from its normal planar position to an outer flexed position in response to pressure differences between the housing interior and the ambient air. The switch actuator button includes a stem portion and an enlarged head positioned in engagement with the diaphragm wherein a cuspidal annular gap between the head and switch diaphragm seat allows the diaphragm to flex in a convoluted manner into control sensitive conformity with the actuator head. The assembly is structured to limit travel of the button in a direction for transmitting movement of the diaphragm to the snap-action switch, thereby obviating the need to discharge the air conditioning system upon removal of the switch means.

1 Claim, 4 Drawing Figures

ACCUMULATOR CYCLING SWITCH

This invention relates to vehicle air conditioning and more particularly to an improved combination accumulator housing and cycling switch assembly for controlling compressor operation.

As discussed in co-pending U.S. patent application Ser. No. 817,604—F. W. Hodits, filed July 21, 1977, now abandoned, entitled "Air Conditioning Cycler", and assigned to the assignee of the present application, it is well known to selectively energize drive means between a vehicle engine and an air conditioning compressor. The resultant cycling of the compressor operation allows the refrigerant temperature and pressure within the evaporator to be maintained at levels corresponding to non-freezing temperatures thereby preventing evaporator frost accumulation. The accumulator cycling switch of the above-mentioned Hodits patent application discloses a combination accumulator and cycling switch wherein a mechanically actuated electric microswitch is mounted within a switch housing secured to the external surface of the accumulator housing. The patent application Ser. No. 817,604 accumulator housing has a wall area of decreased thickness in juxtaposed aligned relation to a switch housing which includes a switch actuating button in operative engagement with the mid portion of the thinned wall area. As the pressure within the interior of the accumulator housing increases in proportion to the increased pressure in the evaporator, the thinned wall area is forced outwardly and actuates the switch to its closed operative mode with a resultant energization of the compressor clutch causing refrigerant to be pumped by the compressor through the system. As the pressure within the evaporator interior and the connected accumulator housing decreases to a predetermined low level it allows the thinned wall area of the housing to move inward or away from the switch assembly, deactivating the compressor clutch. Thereafter, the refrigerant within the evaporator and accumulator housing gradually increases in pressure due to the temperature increase associated with "boiling" the refrigerant therein until the thinned wall area moves outward to again close the switch. While the Hodits patent application Ser. No. 817,604 eliminates costly temperature control switches and simplifies certain manufacturing and assembly operations, the production of a housing incorporating a thin walled diaphragm portion requires close tolerance production control operations.

Accordingly, it is an object of the present invention to provide an improved accumulator and cycling switch assembly for an air conditioning system to control the operation of an electrically controlled compressor regulating refrigerant pressure within the evaporator, thus preventing evaporator temperature from decreasing below a frost accumulation level. Specifically, the invention comprises a support member joined to an exterior wall portion of the accumulator housing encircling aperture means therein with an electrical snap-action switch retained by the support member. A washer, including a motion-transfer switch actuator, is secured within the support so as to encircle the aperture means with the washer face defining a seat for a resilient diaphragm located ajacent the exterior wall portion. The diaphragm is located in spaced relation with the accumulator wall portion such that in its normal position it is substantially parallel to the accumulator wall portion. Seal means cooperate with the diaphragm to effectively seal-off communication between the interior of the housing and the ambient air. An axial bore through the washer includes a counterbore defining a stepped diaphragm seat such that the central portion of the diaphragm extends over the counterbore for outward flexure from its normal planar position in response to an increased pressure within the housing. The switch actuator button includes a stem portion, positioned in axial slidable relation within the washer bore, and enlarged head positioned for engagement by the diaphragm central portion causing axial outward travel of the button in the counterbore. The head portion and the counterbore have respective peripheral edges facing each other and radiused in like manner to define a cuspidal annular gap therebetween whereby the central portion of the diaphragm flexes and partially conforms to the annular gap in a convoluted manner in response to pressure changes within the housing. In addition the head portion defines shoulder means facing the stepped seat so as to be operative to contact the stepped seat for limiting movement of the button in a direction for transmitting movement of the diaphragm to the switch actuator portion while the resilient diaphragm remains effective to close the housing aperture. Thus, upon removal of the electrical switch, the movement of the actuator button away from the housing wall portion is limited when its shoulder means contacts the stepped seat, thereby obviating the need to discharge the air conditioning system of its refrigerant charge during the removal of the switch.

Other advantages and features of the present invention will be more readily apparent from a reading of the following detailed description and an examination of the accompanying drawings in which a preferred embodiment of the invention is illustrated.

Figure 1:
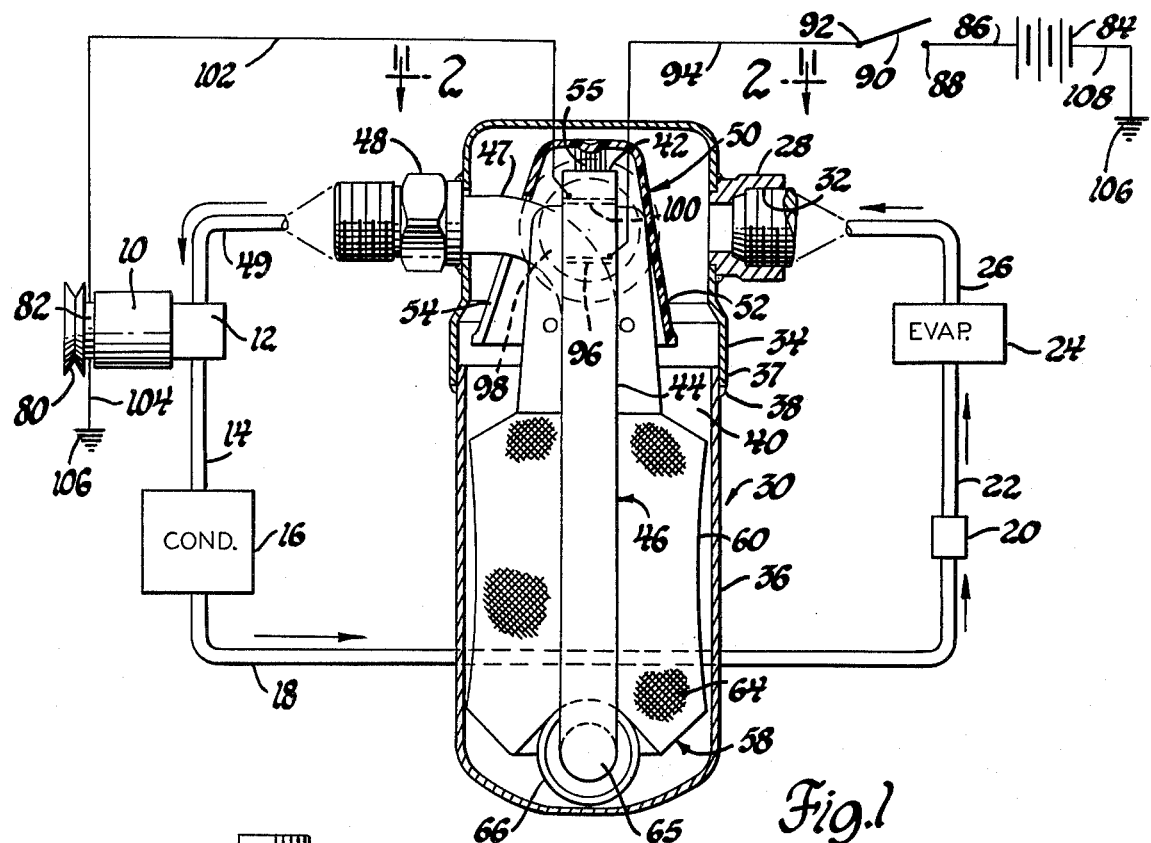
FIG. 1 is a schematic view of an air conditioning system with an enlarged view of an accumulator with its attached switch assembly.
Figure 2:
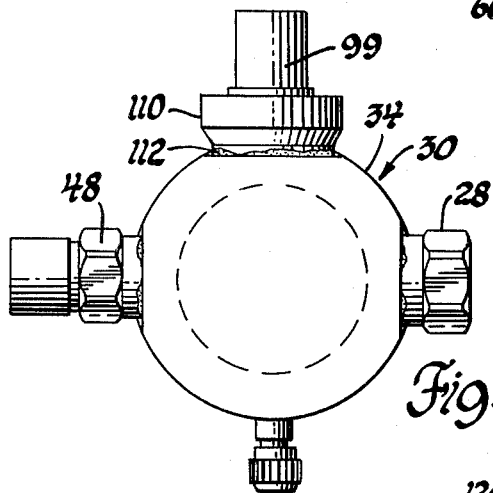
FIG. 2 is a top plan view of the accumulator taken on the line 2—2 of FIG. 1.

An air conditioning system is shown schematically in FIG. 1 and includes a compressor 10 for pumping and pressurizing refrigerant. The compressor 10 may be an axial piston type as presently used in many GM air conditioned vehicles. Compressor 10 includes a fitting 12 at one end providing an outlet adapted to be connected to a conduit 14 leading to a condensor 16. Condensor 16 is normally placed forward of the vehicle radiator and its purpose is to cool and liquify the hot vaporous refrigerant from the compressor 10. The condensor 16 has an outlet connected to a conduit 18 which in turn is connected to the inlet of an orifice tube expander 20. The orifice tube expander is a short length small diameter tube within a housing to reduce the pressure of the liquid refrigerant and then to pass the lower pressure refrigerant through a conduit 22 to the inlet at the bottom of an evaporator 24. The low pressure liquid refrigerant enters the evaporator 24 and passes through vertical tubes to the top portion while absorbing heat from air passing between the tubes of the evaporator, thus cooling the air. As the refrigerant absorbs heat from the air, the liquid refrigerant boils or is vaporized and passes from the evaporator via conduit 26 through the inlet fitting 28 of an accumulator generally indicated at 30.

The accumulator assembly 30 has an inlet 32 passage to pass refrigerant from the evaporator. The evaporator refrigerant may carry significant amounts of liquified refrigerant along with vapor. Since it is undesirable to pass liquid refrigerant to the compressor 10, one of the purposes of the accumulator 30 is to separate liquid refrigerant from vaporous refrigerant.

The accumulator 30 includes an upper inverted cup-shaped housing member 34 and a lower cup-shaped housing member 36 which are telescopically joined at a lap joint 37 and secured by suitable means such as by a weld 38. The housing members 34, 36 define a hollow interior chamber 40 into which the mixture of vaporous and liquid refrigerant passes from inlet passage 32. Liquid refrigerant tends to settle toward the bottom of the interior chamber 40 and vaporous refrigerant is drawn from the top portion of chamber 40 through an outlet opening 42 in a vertically extending outlet conduit or standpipe portion 44 of a substantially U-shaped tube indicated generally at 46. For a detailed description of the accumulator reference should be had to the co-pending patent application Ser. No. 912,462—Widdowson et al, filed June 6, 1978 and assigned to the assignee of the present application. It will be noted that vaporous refrigerant passes through the U-tube standpipe 44 and its angled bend portion 47 and fitting 48 to enter suction line 49 shown attached to compressor fitting 12 providing return of the vaporous refrigerant to the compressor 10.

The upper end of the standpipe portion 44 supports an inverted cone-shaped deflector or baffle member 50 preferably made of plastic material. Baffle member 50 is a generally thin-walled member having an outer wall 52 with an elongated slotted portion 54 for reception of the bend portion 47. The baffle has conforming arcuate sections 55 supported on radial ribs (not shown) to provide a telescopic slidable press-fit in the upper end of the standpipe portion 44. The mixture of vaporous and liquid refrigerant enters the chamber 40 through the inlet passage 32 and in a direction causing the flow to impinge against the outer surface of wall 52. The impact of the mixture tends to separate the liquid portion from the vaporous portion and then pass from the outer surface of the baffle wall 52 toward the bottom of chamber 40. Vaporous refrigerant passes downward and around the lower edge of the baffle wall 52 into the open end 42 of the standpipe 44. Accumulated liquid refrigerant in the bottom of chamber 40 eventually vaporizes due to the low pressure conditions which exist within the accumulator caused by the evacuation thereof of the compressor 10.

A desiccant assembly 58 is supported within chamber 40 and includes an envelope or bag 60 of screen-like plastic material containing a quantity of moisture-absorbing desiccant which may be silica gel particles. The bag 60 is made of cloth-like nylon material 64 whose edges are heat sealed together to form the bag 60. Moisture mixed with refrigerant in the system is absorbed by the silica gel particles within the bag and held therein to the exclusion of refrigerant.

In addition to the liquid refrigerant collecting in the bottom portion of the chamber 40, a quantity of oil will also be present. The oil is originally intermixed with the refrigerant in the air conditioning system so as to circulate therewith serving to lubricate the compressor 10. To prevent a substantial quantity of oil from collecting in the accumulator U-tube 46, a small bleed hole (not shown) is provided on the underside of the U-tube bight portion 65 for gravity flow into chamber 40. Oil and a small quantity of liquid refrigerant is drawn into the suction line 49 and back to compressor 10 thus preventing excessive oil accumulation in interior chamber 40. To keep the small oil bleed hole open a filter assembly 66, including a cylindrical screen member (not shown), is supported around the bight portion 64 as disclosed in the above-mentioned Widdowson et al patent application.

In operation, on an extremely warm day, i.e. in the neighborhood of 100° F., the compressor 10 will undoubtedly have an insufficient compressing capacity to provide a quantity of refrigerant to remove the heat from air passing through the evaporator and thereby lower the evaporator temperature below freezing. On a cooler day, however, the compressor will likely have an over-capacity when operated full time causing the evaporator to be cooled to a temperature resulting in undesirable frost accumulation. In an extreme case, the buildup of frost on the surfaces of the evaporator may actually result in blockages of the air passages through the evaporator.

As stated above on a hot summer day, frost accumulation on the evaporator surfaces is unlikely. When the air conditioning system is operated in an ambient temperature environment of say 70° F., the interior of the vehicle may cool down fairly rapidly and the recirculated air passed through the evaporator will be at a relatively low temperature. Under these conditions, it is undesirable to operate the compressor 10 continuously, partly because the interior temperature of the vehicle would drop below comfortable levels. Also, the temperature of refrigerant passing through the evaporator would fall below 32° F. and frost would begin to form on the evaporator external surfaces. Accordingly, provision is made in the system shown in FIG. 1 to cycle the compressor 10 on and off to maintain refrigerants passing through the evaporator above a predetermined temperature and pressure which will prevent the accumulation of frost on the evaporator's surface.

The compressor 10 of FIG. 1 is driven by a V-belt (not shown) which is operably connected to the crankshaft of an internal combustion engine. The other end of the belt passes around a pulley 80 which is attached to the input shaft of an electromagnetic clutch 82. The output of the clutch 82 is connected to the shaft of the compressor 10. When a sufficient voltage is applied to the coils of the electromagnetic clutch 82, the resultant connection between pulley 10 and the compressor shaft will produce pumping and compressing action of the compressor 10.

The electromagnetic clutch 82 is energized through a circuit extending from the positive terminal of a battery 84 through a conductor 86 to one terminal 88 of master switch 90 which may be the ignition switch. The other terminal 92 of the switch 90 is connected to conductor 94 which is in turn connected to one terminal 96 of a normally open type switch 98. Another terminal 100 of the switch 98 is connected by conductor 102 to one terminal of the electromagnetic clutch coil while the other terminal of the clutch coil is connected by a conductor 104 to ground 106. To complete the circuit, the negative side of battery 84 is connected by a conductor 108 to ground 106.

Figure 3:
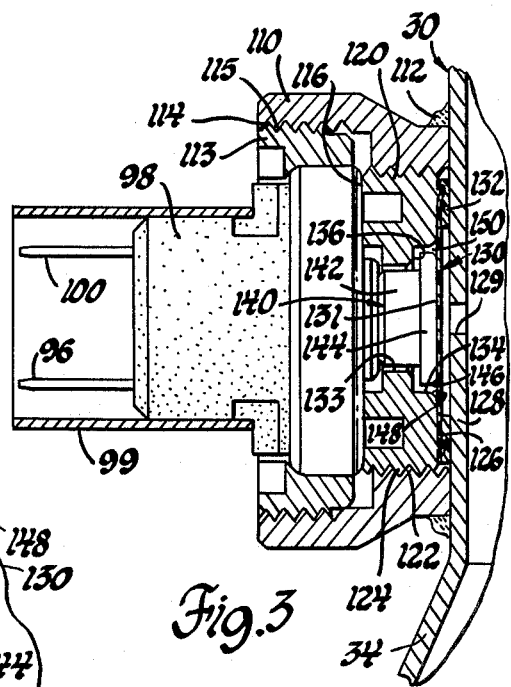
FIGS. 3 and 4 are enlarged fragmentary cross-sectional views of the accumulator showing the switch in its off and on positions, respectively.

As best seen in FIG. 3, the switch 98, which in the preferred form is a miniaturized or micro switch of the normally open type, is partially enclosed by tubular member 99. The switch is retained within support member or housing 110 shown attached, as by welding 112, to the exterior of the accumulator upper housing member 34. Specifically, the switch 98 is attached to a cylindrical ring mount 113 having threads 114 on its outer surface which threadably engage threads 115 on an interior large bore of member 110. Thus, the ring mount 113 is movable in the threaded bore of member 110 which permits the micro switch 98 to move inward and outward with respect to the outer first face 116 of washer member 120. The switch support 110 has a small bore with internal threads 122 which mount the washer member 120 by means of its external threads 124. The washer member has a face on its inner periphery defining a diaphragm seat 126 encircling aperture means adjacent to the upper housing member wall portion 128. In the disclosed form the aperture means is a single hole 129.

A flexure or creep action disk-like diaphragm 130 is removably positioned within the support member 110 on the peripheral seat 126 and is preferably made of resilient plastic material such as polyamide or the like. The diaphragm 130, formed in a substantially planar manner, is secured in spaced relation to the wall portion 128 by being interposed between a resilient gasket or sealing ring 132 and the washer member 120. It will be seen that the perimeter portion of the diaphragm 130 is compressed into sealing contact with the seat 126 by threadably tightening the washer 120 so as to overlie the aperture means or hole 129 in aligned spaced concentric relation thereby establishing a normal planar position of the diaphragm substantially parallel to the wall portion 128. In this manner the diaphragm 130 is effective to close the hole 129 to thereby seal off communication between the interior chamber 40 of the housing and ambient air. Axial bore 133, extending through the washer member 120, includes a counterbore 134 on its inner face defining a stepped seat 136.

A motion-transfer member in the form of a switch actuator button, generally indicated at 140, is provided having a stem portion 142 positioned for axial slidable movement within the washer axial bore 133. The button has a head portion 144 positioned in engagement with the diaphragm central portion 131 for axial travel in the counterbore 134. Acutator head portion 144 and the counterbore 134 have their concentric peripheral edges 146, 148 respectively facing each other with the edges being radiused in a like manner to define a cuspidal annular gap 150 therebetween.

Figure 4:
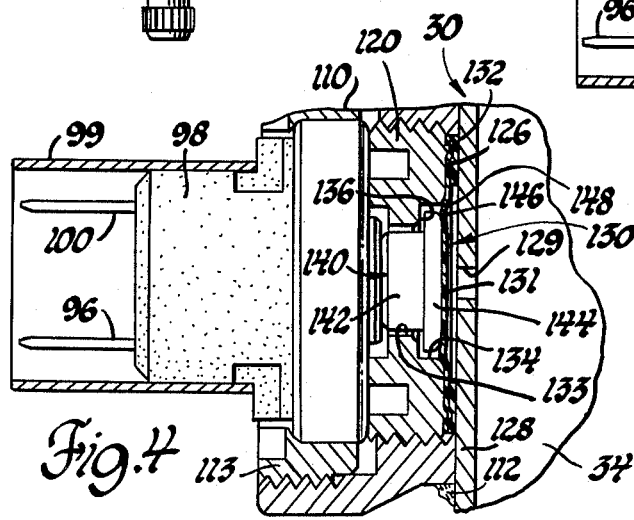

It will be appreciated that by virtue of forming the cuspidal annular gap 150 applicants' flexing or creep-acting diaphragm 130, as distinguished from a snap action diaphragm, flexes to its FIG. 4 convoluted shape achieving improved conformity to the face and radiused edge portion 148 of the actuator button 140 providing for more sensitive control of the pressure effective area of the diaphragm. A further advantage of applicants' cuspidal annular gap 150 resides in minimizing fatigue induced wear of the diaphragm caused by its repeated flexure.

The operation of applicants' cycling control switch 98 is as follows. As seen in FIG. 3 when the pressure in the accumulator chamber is at or below a predetermined low level, which in the disclosed form is about 25 lbs. per sq. in. (psi) the mid-portion of the diaphragm is in operative engagement with the switch button 140. As the pressure within the accumulator chamber 40 increases in proportion to the increased pressure in the evaporator 24, the diaphragm 130 is forced outward against the button 140. When the pressure reaches a predetermined value, about 46 psi in the disclosed form, the diaphragm moves the button 140 to its FIG. 4 position actuating the switch 98 to its closed or ON position. In the preferred form the switch 98 is of the snap acting type having a disc which is snapped to its overcenter make position with the diaphragm moved to its position shown in FIG. 4. With the closed switch 98 in its operative mode the compressor clutch 82 is energized with the result that the compressor pumps refrigerant through the system to the evaporator 24.

After operation of the compressor for a given interval, the pressure within the evaporator interior and the connected accumulator chamber 40 decreases. When the refrigerant pressure in the accumulator decreases to said predetermined lower value, the diaphragm 130 is moved inwardly away from the micro switch 98 under the force of the resiliently biased actuator button 140 allowing the snap acting disc to flex overcenter and return to its FIG. 3 switch open mode, thus deactivating the compressor clutch 82.

While the embodiment of the invention as herein disclosed constitutes a preferred form, it is to be understood that other forms might be adopted.

The embodiments of the invention in which an exclusive property or privilege is claimed are defined as follows:

1. A combination accumulator housing and cycling switch assembly for an air conditioning system to control the operation of an electrically controlled compressor for the purpose of regulating refrigerant pressure within an evaporator which is located upstream and connected to the housing, thus preventing evaporator temperature from decreasing below a frost-accumulation level, the housing being a hollow member with walls having an inlet adapted to be connected to the output of the evaporator for receiving into said chamber compressed refrigerant and an outlet adapted to be connected to the inlet of a compressor for supplying refrigerant to said compressor, aperture means in a planar wall portion of said housing, a switch support member joined to said wall portion encircling said aperture means, an electrical switch supported by said switch support member, including a projecting movable portion, a washer member secured within said support member with its inner face defining a planar diaphragm seat, an annular resilient diaphragm within said support member mounted on said seat in overlying spaced concentric relation with said aperture means, the periphery of said diaphragm contacting said seat thereby establishing a normally planar position of said diaphragm substantially parallel to said wall portion, a resilient sealing ring positioned between the wallside of said diaphragm periphery and said wall portion to provide a seal, whereby said resilient diaphragm is effective to close said aperture means to thereby close off communication between the interior of said housing and the ambient air, an axial bore through said washer member aligned with said housing aperture means including a counterbore on said inner face defining a stepped seat, the central portion of the diaphragm extending over said counterbored portion being resiliently deformable so as to be movable in an outward direction from its planar seated position in response to pressure differences between said housing interior and the ambient air, an actuator button for said switch means having a stem portion positioned in slidable relation within said axial bore and an enlarged rounded head portion positioned in engagement with said diaphragm central portion for axial travel in said counterbore, said counterbore outer peripheral edge being radiused substantially complementary to said rounded head defining a cuspidal-like sectioned annular gap between said head portion and said counterbore whereby said diaphragm central portion partially conforms to said annular gap upon a relative pressure increase within said housing, the underside of said head portion defining shoulder means operative to contact said stepped seat for limiting movement of said button in an outward direction for transmitting movements of said diaphragm to said switch movable portion by means of said actuator button, whereby upon removal of said electrical switch said actuator button shoulder means contacts said stepped seat thereby limiting said diaphragm to a predetermined maximum outwardly bowed position obviating the need to discharge said air conditioning system of its refrigerant charge during the removal of said switch means.

* * * * *